United States Patent
Weicker et al.

(10) Patent No.: US 10,320,207 B2
(45) Date of Patent: Jun. 11, 2019

(54) SYSTEMS AND METHODS FOR INTELLIGENTLY CHARGING BATTERY CELLS

(71) Applicant: Faraday&Future Inc., Gardena, CA (US)

(72) Inventors: Phillip John Weicker, Los Angeles, CA (US); Omourtag Alexandrov Velev, La Crescenta, CA (US); Anil Paryani, Cerritos, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/632,232

(22) Filed: Jun. 23, 2017

(65) Prior Publication Data

US 2018/0131204 A1    May 10, 2018

Related U.S. Application Data (60) Provisional application No. 62/354,060, filed on Jun. 23, 2016.

(51) Int. Cl.
*H02J 7/00* (2006.01)
*H02J 7/14* (2006.01)
*B60L 58/12* (2019.01)

(52) U.S. Cl.
CPC ........... *H02J 7/0029* (2013.01); *B60L 58/12* (2019.02); *H02J 7/0047* (2013.01); *H02J 7/14* (2013.01); *H02J 7/0022* (2013.01); *H02J 2007/0037* (2013.01); *Y02T 10/7005* (2013.01); *Y02T 10/705* (2013.01); *Y02T 10/7044* (2013.01)

(58) Field of Classification Search
CPC .............. H02J 7/0031; H02J 2007/004; H02J 2007/0037; Y02E 60/12; H01M 10/48
USPC ........................................................ 320/134
See application file for complete search history.

(56) References Cited

U.S. PATENT DOCUMENTS

| | | | | |
|---|---|---|---|---|
| 5,311,113 A * | 5/1994 | Kojima | .............. | H02J 7/0081 320/148 |
| 2003/0106726 A1* | 6/2003 | Yoshii | .............. | B60K 6/26 180/65.1 |
| 2005/0017686 A1* | 1/2005 | Sakakibara | ........ | G01R 31/3679 320/132 |
| 2008/0100266 A1* | 5/2008 | Sobue | .............. | G01R 31/3658 320/134 |
| 2009/0295332 A1* | 12/2009 | Yang | .............. | H02J 7/0029 320/132 |
| 2010/0019718 A1* | 1/2010 | Salasoo | .............. | B60L 3/0046 320/103 |
| 2010/0194346 A1* | 8/2010 | Lee | .............. | H02J 7/0031 320/134 |

(Continued)

*Primary Examiner* — Arun C Williams
(74) *Attorney, Agent, or Firm* — Veros Legal Solutions, LLP (57) ABSTRACT

A battery management system (BMS) connected to a battery is disclosed. The battery management system includes a battery status component configured to detect one or more parameters of the battery; a timer component configured to compute an amount of time needed to recharge the battery based on one or more of the parameters of the battery; and a scheme initiation component configured to determine an optimal time to begin charging based on the amount of time needed to recharge the battery.

14 Claims, 4 Drawing Sheets

(56) References Cited

U.S. PATENT DOCUMENTS

2011/0043170 A1* 2/2011 Kim .................... H01M 10/425
 320/136
2015/0145484 A1* 5/2015 Shibata ............. H01M 10/4257
 320/134

* cited by examiner

SYSTEMS AND METHODS FOR INTELLIGENTLY CHARGING BATTERY CELLS

CROSS-REFERENCE TO RELATED APPLICATIONS

This application claims the benefit of U.S. Provisional Application No. 62/354,060, filed Jun. 23, 2016, the entirety of which is hereby incorporated by reference.

TECHNICAL FIELD

The present disclosure relates generally to systems and methods for enhancing the amount of energy provided by rechargeable battery cells, and more particularly to a system and method for intelligently overcharging battery cells to enhance energy capacity while minimizing damage to the battery's chemical constituents (e.g. electrolytes).

BACKGROUND OF THE DISCLOSURE

Batteries are used as portable energy sources in an increasing number of applications. From mobile phones and laptop computers to motor vehicles and drones, batteries enable a plethora of devices to operate independently from immobile energy sources, at least for a limited time. Of course, as these devices become larger and more complex, more energy is required from the batteries that operate them. In particular, electric vehicles impose high demands on the batteries they run on, and the control of those batteries (e.g. charging and recharging schemes) can greatly affect the amount of energy the vehicle (or other device) may ultimately draw from the battery.

Batteries accumulate and store electric charge when they are connected to an external energy source, and then release that charge to a load (e.g. a mobile phone) to provide the energy needed to power the device. The amount of energy a battery can safely hold is commonly referred to as the battery capacity. Battery capacity is dependent, in part, upon the mass and makeup of active material contained in the battery cells (e.g., the materials that make up the anode, the cathode, and/or the electrolyte). In an effort to preserve the chemistry of a given battery, conventional battery management systems and/or conventional battery charging schemes do not exploit the full potential of modern batteries. In view of these drawbacks, there exists a long-felt need for systems and methods that enable modern rechargeable batteries to operate at higher capacity.

BRIEF SUMMARY OF THE DISCLOSURE

Some embodiments of the present disclosure are directed toward a system for intelligently overcharging a battery with a higher voltage than specified by the manufacturer (or other provider). The system may comprise one or more physical computer processors configured by computer readable instructions to: determine a future output requirement for a battery; determine a first usage time, wherein the first usage time is the time the future output of the battery is anticipated to commence; determine a recommended maximum set voltage for the battery; compute a total charge time to charge the battery to a predetermined set voltage, wherein the predetermined set voltage is higher than the recommended maximum set voltage; initiate an overvoltage overcharging scheme such that the overvoltage overcharging scheme completes within a predefined time period prior to the first usage time.

Some embodiments of the present disclosure are directed toward a method for intelligently overcharging a battery. The method may comprise the steps of: determining a future output requirement of a battery; determining a first usage time, wherein the first usage time is the time the future output of the battery is anticipated to commence; determining a recommended maximum set voltage for the battery; compute a total charge time to charge the battery to a predetermined set voltage, wherein the predetermined set voltage is higher than the recommended maximum set voltage; initiate an overvoltage overcharging scheme such that the overvoltage overcharging scheme completes within a predefined time period prior to the first usage time.

Some embodiments of the present disclosure are directed toward a method for intelligently overcharging a battery. The method may comprise the steps of: supplying current to a battery at a fixed rate until a voltage measure of the battery reaches a predetermined set voltage, wherein the predetermined voltage is higher than a recommended maximum set voltage; upon the voltage measure of the battery reaching the predetermined set voltage, supplying current to the battery at a dynamic rate such that the voltage measure is substantially maintained at the predetermined voltage until the current supply rate falls beneath a predetermined threshold; and partially discharging battery after battery has been held at the predetermined set voltage for predetermined period of time.

BRIEF DESCRIPTION OF THE DRAWINGS

The accompanying drawings, which constitute a part of this disclosure, illustrate several embodiments and, together with the description, serve to explain the disclosed technology.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Current battery charging technologies do not take advantage of the intelligent overvoltage overcharging technologies of the present disclosure, and therefore cannot realize the enhanced energy output realized when the disclosed systems and methods are employed. The disclosed systems and methods enhance the amount of energy that may be drawn from a given battery by intelligently and/or selectively employing overvoltage overcharging techniques while minimizing damage to battery chemistry. The disclosed systems and methods may mitigate or overcome one or more of the problems set forth above and/or other problems in the prior art.

Figure 1:
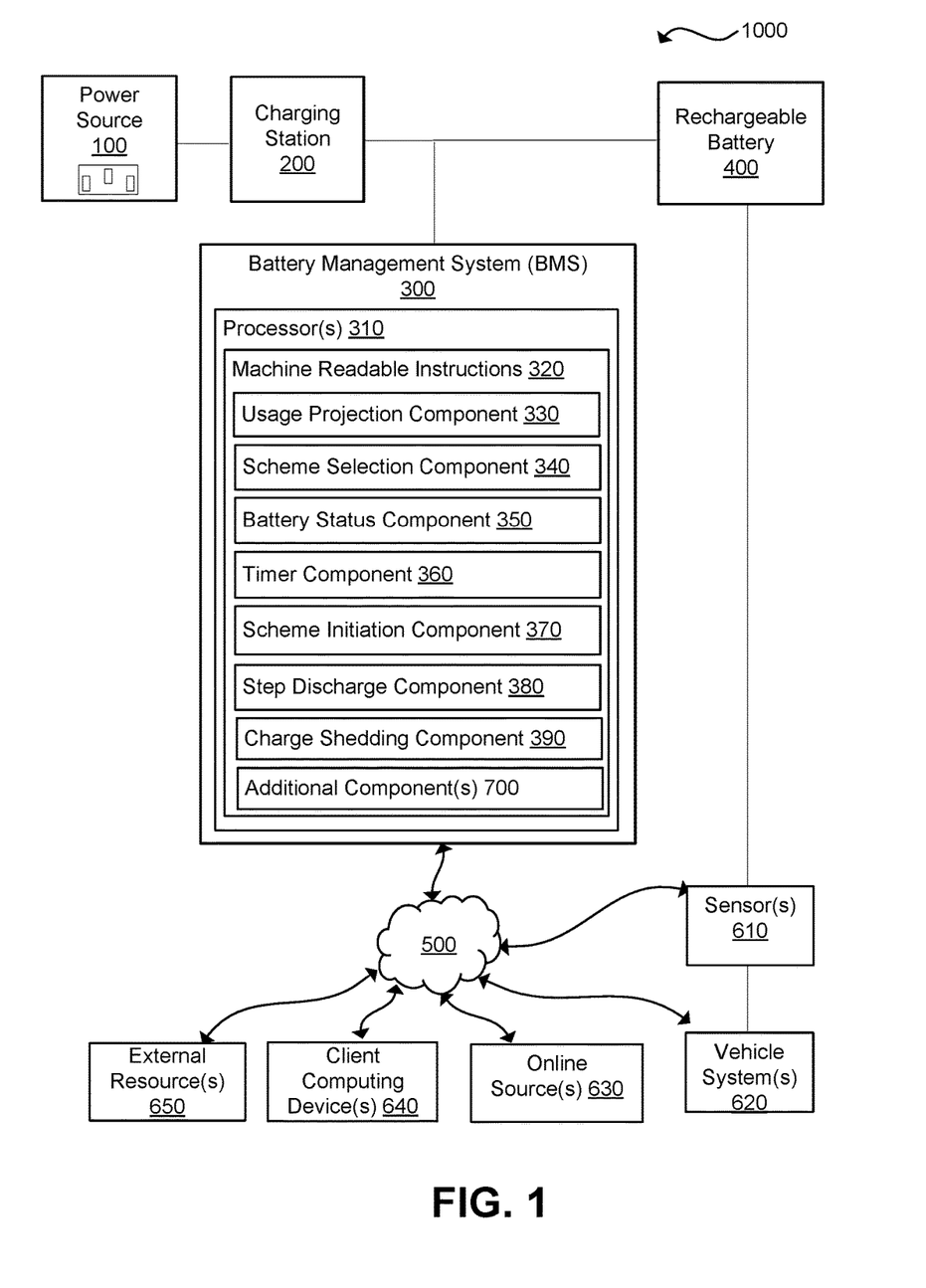
FIG. 1 depicts an intelligent battery charging system in accordance with one or more embodiments of the present technology.

FIG. 1 depicts an intelligent battery charging system in accordance with one or more embodiments of the present technology. As shown, intelligent battery charging system 1000 may include one or more power source(s) 100, charging station(s) 200, battery management system(s) 300, rechargeable battery(-ies) 400, sensor(s) 610, vehicle system(s) 620, online source(s) 630, client computing platform(s) 640, and or external resource(s) 650. In some embodiments of intelligent battery charging system 1000, power source 100 is operatively coupled with charging station 200 to deliver current into the rechargeable battery 400 under the control of and/or in accordance with battery management system(s) 300. As depicted, and to effectuate the intelligent control mechanisms provided in the instant disclosure, battery management system 300 may include (or be operatively coupled with) one or more physical processor(s) 310 configured to execute machine-readable instructions 320. As shown, in some embodiments machine-readable instructions 320 of BMS 300 may include one or more computer program components such as usage projection component 320, scheme selection component 340, battery status component 350, timer component 360, scheme initiation component 370, step discharge component 380, charge shedding component 390, and/or one or more additional component(s) 700.

Usage Projection Component 330 may be configured to receive information from one or more sources, and to determine a prediction about a future usage or output requirement of rechargeable battery 400 based on the received information. Such information may include any information that may provide insight into future usage (e.g. date/time/distance/energy required/route of travel/number of passengers/etc.) of the battery. For example, the information received by usage projection component 330 may include GPS data (e.g. current vehicle location), user generated data (e.g. a destination address set as the home address in user's mobile phone, transaction data (e.g. tickets purchased by user for next day at 7:00 pm for a basketball game taking place 172 miles away), historical travel data (e.g. each Thursday morning at approximately 8:00 am, user drives to Los Angeles, Calif. to work for a weekly meeting at 10:30 am), calendar data (e.g. user's Outlook calendar indicates the Thursday morning meeting in Los Angeles was canceled on Monday), real-time or historical traffic (e.g. road construction is occurring along the user's usual route from Santa Barbara, Calif. to Los Angeles, Calif., and the estimated drive time is 4 hours), weather/road condition data (e.g. anticipated rainfall during the anticipated time of travel), media data (e.g. news headlines indicate a hurricane will hit the shores of Santa Barbara at approximately 11:00 pm), vehicle data (e.g. tire pressure is less than recommended by the manufacturer of this tire by "x" amount, and it will thus require "y" more energy per mile of travel), charging station location data (e.g. the anticipated route includes just three charging stations, one at "location A," one at "location B," and one at "location C"), battery 400 capacity data (e.g. the cycle sensor of the battery indicates it is on its $76^{th}$ discharge cycle and that its capacity, when charged to the manufacturer's recommended full charge limit, will be reduced by approximately 3 percent), number-of-passenger data (e.g., calendar indicating family road trip to Los Angeles, Calif. and the system predicting four passengers including two adults and two kids and obtaining their weight information), user generated data (e.g. user input via a computing device detailing the date/time/distance/route/number of passengers/etc. of upcoming travel in their electric car), and/or any other insightful information from any source.

As depicted, BMS 300 may be operatively coupled to any number or type of source that may provide insightful information to enable usage projection component 330 to make a projection about a future use of rechargeable battery 400. Exemplary sources may include any one or more sensors (e.g. temperature sensors, pressure sensors, weight sensors, passenger sensors, etc.) coupled with any one or more of the other elements of intelligent battery charging system 1000 (e.g. a battery pressure sensor incorporated into the housing of a battery, an outside temperature sensor fixed to part of a vehicle, etc.). Exemplary sources may include one or more vehicle system(s) 620 (e.g. an in-vehicle GPS system, an HVAC system, etc.), online sources (e.g. media websites, online weather database, social media platforms, traffic data providers, email providers, electronic messaging providers, transactional websites, etc.), client computing devices(s) 640 (e.g. mobile phones, tablets, desktop computers, laptop computers, PDAs, etc.), and/or any external source(s) of any kind.

Usage projection component 330 may then use the received data to determine a prediction about an upcoming future usage of rechargeable battery 400 based on the received information. For example, the usage projection component 330 may have received information from a user's outlook calendar on their mobile phone that a meeting is to take place the next morning at 11:00 am at a location that is approximately 190 miles away with an estimated drive time of 3.5 hours. The usage projection component may further recognize that the user has attended the same meeting the previous three weeks, and in each prior instance began driving at approximately 7:00 am. Thus, usage projection component 330 may project that the user will begin using the battery powered car at 7:00 am the following morning, and he will be driving 190 miles up and 190 miles back in the same day. In some embodiments usage projection component 330 may project an anticipated amount of power and/or energy needed to satisfy the anticipated future usage. For instance, usage projection component 330 may project that the user will need approximately 65 kWhr of battery capacity, the usage to begin at 7:00 am. As described, by way of example and not by way of limitation, usage projection component 330 may receive information from any one or more sources operatively coupled therewith, and make a determination about an anticipated future usage (and an associated future energy requirement based on that anticipated usage) of the battery 400 based on the received information.

Scheme Selection Component 340 may be configured to select among multiple charging schemes. The BMS 300 may store multiple charging programs, for example, a conventional or normal charging scheme, an overvoltage overcharging (OVOC) scheme, one or more programs including different combinations of normal charging and overvoltage overcharging schemes. The normal charging scheme uses a regular current and voltage to charge the battery as recommended by the battery manufacture. The OVOC scheme is to charge the battery to a voltage above the normal maximum voltage. The combination can include, e.g., charging the battery with a normal mode to a manufacture-recommended full capacity or close to that capacity, and before the anticipated use of the car, starting to overcharge the battery to a predetermined overvoltage. The selection may be based on the anticipated future usage of the battery 400 (e.g. as determined by usage projection component 330), based on input provided by a user (e.g. information entered by a user into an interface that is operatively coupled with BMS 300), based on the anticipated time that battery usage will begin (e.g. estimated departure time in the context of a battery for an electric car), and/or based on any other information relevant to selecting among different charging schemes (e.g. manufacturer specified charging parameters, battery charging history, cycle life, etc.). For example, if the usage projection component 330 determines, e.g., based on the user's calendar and map information, that the user will drive a long distance the next day and will consume a significant amount of energy, the scheme selection component 340 may select to use an OVOC scheme at some point of the charging process. If the usage projection component 330 determines that the user will have a normal day of work and drive a short distance the next day and will consume a small amount of energy, the scheme selection component 340 may select a normal charging scheme. If the scheme selection component 340 determines that charging the battery in accordance with the manufacturer's specified charging parameters would be inadequate for an anticipated future use, and/or that the anticipated future use would require more energy than what a full-charge on the battery provides when charged in accordance with the manufacturer's specified charging parameters, then scheme selection component may select an overvoltage overcharging (OVOC) scheme to charge the battery, as described in more detail below with respect to FIG. 2.

Figure 2:
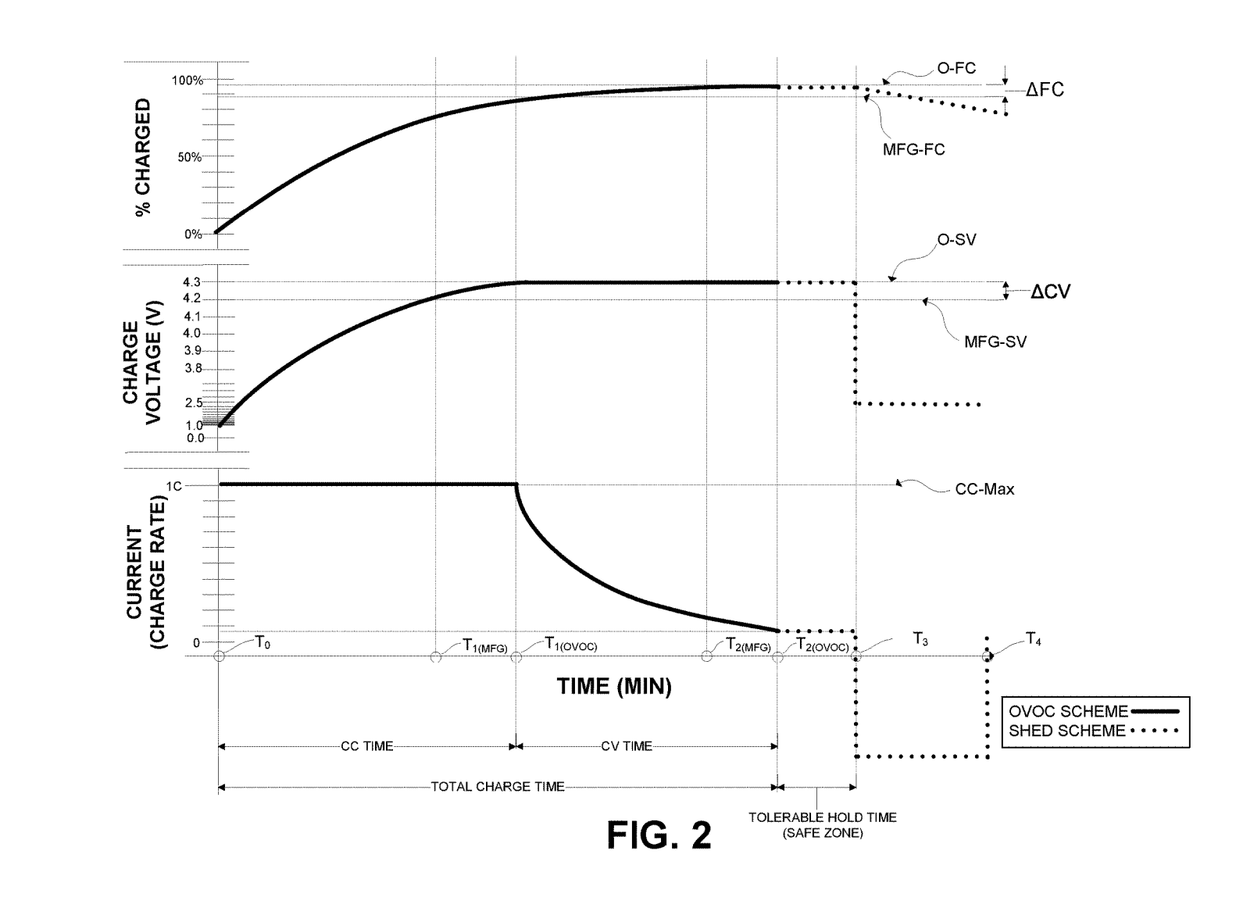
FIG. 2 depicts a charging profile of a battery during an exemplary overvoltage overcharging scheme that may be implemented by a battery management system (BMS) in accordance with some embodiments of the present technology.

FIG. 2 depicts a charging profile of a battery during an exemplary overvoltage overcharging scheme that may be implemented by a BMS in accordance with some embodiments of the present technology. The uppermost plot charts the percentage of charge in the battery as a function of time during a charge cycle. The middle plot charts the charge voltage in the battery cells as a function of time during a charge cycle. The bottommost plot charts the charge rate of the battery (as a function of the current being delivered to the battery) as a function of time during a charge cycle.

The OVOC charging scheme begins at $T_0$. The OVOC charging scheme may be broken into two primary phases, the first phase depicted between $T_0$ and $T_{1(OVOC)}$ and the second phase being depicted between $T_{1(OVOC)}$ and $T_{2(OVOC)}$. The first phase is characterized by the constant current (CC) indicated by the flat line between $T_0$ and $T_{1(OVOC)}$ in the bottom plot of FIG. 2. The second phase is characterized by the constant voltage (CV) indicated by the flat line portion (between $T_{1(OVOC)}$ and $T_{2(OVOC)}$) in the middle plot of FIG. 2. During the first phase, BMS 300 causes/allows the charger to provide a constant current (CC)—generally the maximum charging current allowable—into the battery in an attempt to force the battery voltage up to an overcharge set voltage (O-SV). Once the O-SV is reached (e.g. at $T_{1(OVOC)}$) the charger will discontinue the constant current phase, and begin the constant voltage phase. During the constant voltage phase, the charger reduces the amount of charging current delivered to the battery—as necessary—to hold the voltage of the battery at/near the O-SV until the battery is fully charged (e.g. until the battery is charged to the overcharge full-charge level, O-FC, as indicated by the current falling below a certain threshold (i.e. the cut-off current)), at which point the charging cycle may terminate (e.g. at $T_{2(OVOC)}$). The constant voltage phase results in the current profile taking on the shape of an exponential decay during the $T_{1(OVOC)}$ and $T_{2(OVOC)}$ timeframe. As indicated in FIG. 2, the overcharge set voltage (O-SV) may be higher than the manufacturer's recommended set voltage (MFG-SV) in the OVOC charging scheme. For example, in some embodiments the MFG-SV is 4.2 V (the MFG-SV can be any other number above or below 4.2V) and the O-SV is 4.3V (the O-SV can be other numbers above MFG-SV, e.g., 4.25V, 4.28V, 4.4V, etc., which can be set by the battery module provider, car provider, or the user of the car). Because holding the battery at the O-SV voltage for an extended period of time may cause damage to the chemical makeup of the battery (e.g. breakdown of the electrolyte), in some embodiments the OVOC scheme is only initiated in a time period just prior to the time when the battery will be used, such that the high voltage will not be maintained in the battery for very long after the battery becomes charged at the O-FC level. Moreover, in some embodiments, if the battery has been charged under the OVOC scheme but the anticipated usage does not occur as quickly as anticipated, the BMS may introduce charge shedding methods to lower the voltage in the cells. The BMS 300 may control this via one or more of the battery status component 350, the timer component 360, the scheme initiation component 370, and the charge shedding component 390.

Battery Status Component 350 may be configured to detect one or more parameters of a battery during or after charging. For example, battery status component may detect one or more of the battery charge percentage, battery cell temperature, the battery cell voltage, the rate current is being delivered into the battery, the pressure in the battery cells, etc. Timer Component 360 may be configured to compute total amount of time it will take to recharge the battery under the OVOC charging scheme (or any other charging scheme that may be selected by scheme selection component 340) based on one or more of the battery parameters detected by battery status component 350. Timer component 360 may further be configured to estimate an amount of time the battery may be able to sustain an O-SV voltage of the OVOC charging scheme before intolerable damage to the battery chemistry occurs (e.g. before electrolyte breakdown raises above a predetermined threshold, etc.). Scheme initiation component 370 may be configured to determine an optimal time to begin charging if/when the OVOC charging scheme was selected by the scheme selection component 340. Scheme initiation component 370 may compute the optimal time by utilizing one or more of: the information about the next departure time (or other future usage event) from the usage projection component 330, information about the total recharge time gleaned from the battery status component 350 and the timer component 360, and/or an estimated amount of time that the battery can sustain the O-SV voltage (i.e. the "tolerable hold time zone") of the OVOC charging scheme before intolerable damage to the battery may occur. Scheme initiation component 340 may further be configured to initiate the OVOC scheme (i.e. initiate delivery of the constant current) at the optimal time determined.

For instance, extending the example of the electric car battery, if (1) usage projection component 330 projects that a user's departure time would be 7:00 am, (2) scheme selection component 340 selected the OVOC charging scheme based on the user's projected driving activities throughout the day (i.e. the user's driving itinerary called for maximum energy capacity in battery 400), (3) battery status component 350 detects that the battery had a 40% charge when the user last discontinued use of the car, (4) the timer component 360 estimates it will take 60 minutes to raise the charge to the O-FC level from the present 40% charged level, and (5) the battery status component 350 determines that the battery will be able to sustain the O-FC voltage level with minimal damage (beneath a predetermined threshold) for up to ten minutes after the battery is fully charged, then the scheme initiation component 360 may effectuate initiation of the OVOC charging scheme at approximately 5:55 am, thereby aiming to have the battery fully charged at the O-FC level at 6:55 am and still leaving a window of ten minutes (e.g. between 6:55 am and 7:05 am) as a cushion in case the user leaves a little early or a little late. As noted above, once the user begins using the vehicle, the energy stored in the battery will begin to be used up, and the O-FC level voltage will decrease back down to a level (e.g. 4.2 V or lower) that the battery may be held at extended period of time with little-to-no damage. If the departure plan proceeds as anticipated, the user may be able to realize 4% or more capacity in their battery in comparison to a charging scheme that strictly adheres to the manufacturer's specifications. Moreover, the added energy uses the same battery, has the same weight, and avoids unacceptable damage to the battery cell chemistry with precision timing mechanisms.

The BMS 300 may also use a combination of normal charging and overcharging. For example, if the user comes back home at 6 pm, and the usage projection component 300 determines that the user will leave at 7 am the next morning (e.g., based on the user's input (e.g. manual input via touch sensitive transducer, voice input, etc.), user's calendar or normal leaving time), the BMS 300 may start to charge the battery from 6 pm, using a normal charging mode, and fully charge the battery to a MFG-FC state (to a MFG-SV voltage), by e.g. 9 pm. In the next morning, at 6:30 am, the BMS 300 may start to charge the battery again to an O-FC state with an O-SV voltage and complete the overcharging by 7 am. By this way, the battery is overcharged right before the user starts to use it, and the battery will not stay overcharged for a long period of time. A person having ordinary skill in the art should appreciate that the division point (voltage, timing) between normal charging and overcharging can be varied. For example, in the first section, using the normal charging mode, the battery can be charged to 95% of the MFG-FC state, and in the second section, using the overcharging mode, the battery can be charged from 95% of the MFG-FC state to O-FC state.

In another embodiment, the BMS 300 may determine, e.g., based on GPS and map information, that the user is charging the battery in the middle of a trip. Since the BMS 300 knows that the user will drive the car again right after the charging, the scheme selection component 340 may choose the OVOC scheme to charge the battery to an O-FC state.

The intelligent battery charging system 1000 of the present disclosure may optimally and safely raise the voltage of a battery above the upper limits specified by the manufacturer, in some instances, in a manner that minimizes damage to the battery's chemistry but yields a significantly higher amount of energy for a user to enjoy. In some instances, the OVOC charging scheme has been seen to increase the battery cell energy capacity by 4% or more.

In some embodiments, BMS 300 may further include a charge shedding component 390. In such embodiments, charge shedding component 300 may operate as a fail-safe for the OVOC charging scheme. In the event any one or more of the components or element of intelligent battery charging system 1000 causes the battery to be charged at an O-FC level, and the user in reality does not begin using the battery power up within the "tolerable hold time—safe zone," charge shedding component 300 may initiate one or more events to draw charge out of the battery to drop the voltage down to a more sustainable level (e.g. draining the battery from 4.3V to 4.2V to avoid harm to the electrolyte). The charge shedding component 390 may do this in any manner and for any amount of time. For example, being operatively coupled to other vehicle system 620, charge shedding component 390 may draw charge out of the overcharged battery by turning on any one or more vehicle systems such as, the motor (e.g., first disengaging the motor from the transmission and spinning the motor), the HVAC system, the display pad, or even the battery cooling system. Indeed, the charge shedding component may cause the battery may use its own stored charge to cool the battery down, all while lowering the voltage in the entire battery to a safer level. In some embodiments, charge shedding component 390 operates until the voltage level returns to the manufacturer's recommended max set voltage (e.g. 4.2 V). As shown in FIG. 2, upon passage of (or near passage of) the safe zone period (i.e. the time period between $T_{2(OVOC)}$ and $T_3$), charge shedding component 390 may draw charge from battery (as described above) by turning on one or more systems that use the battery for a period of time (i.e. the time period between $T_3$ and $T_4$) while the voltage returns to a level where the chemistry of the battery can remain stable (e.g. the MFG-SV level). In some embodiments, the safe zone time period between $T_{2(OVOC)}$ and $T_3$ is about between 1 minute and 10 minutes. In other embodiments, the safe zone time period may be less than 1 minute or greater than 10 minutes.

Figure 3:
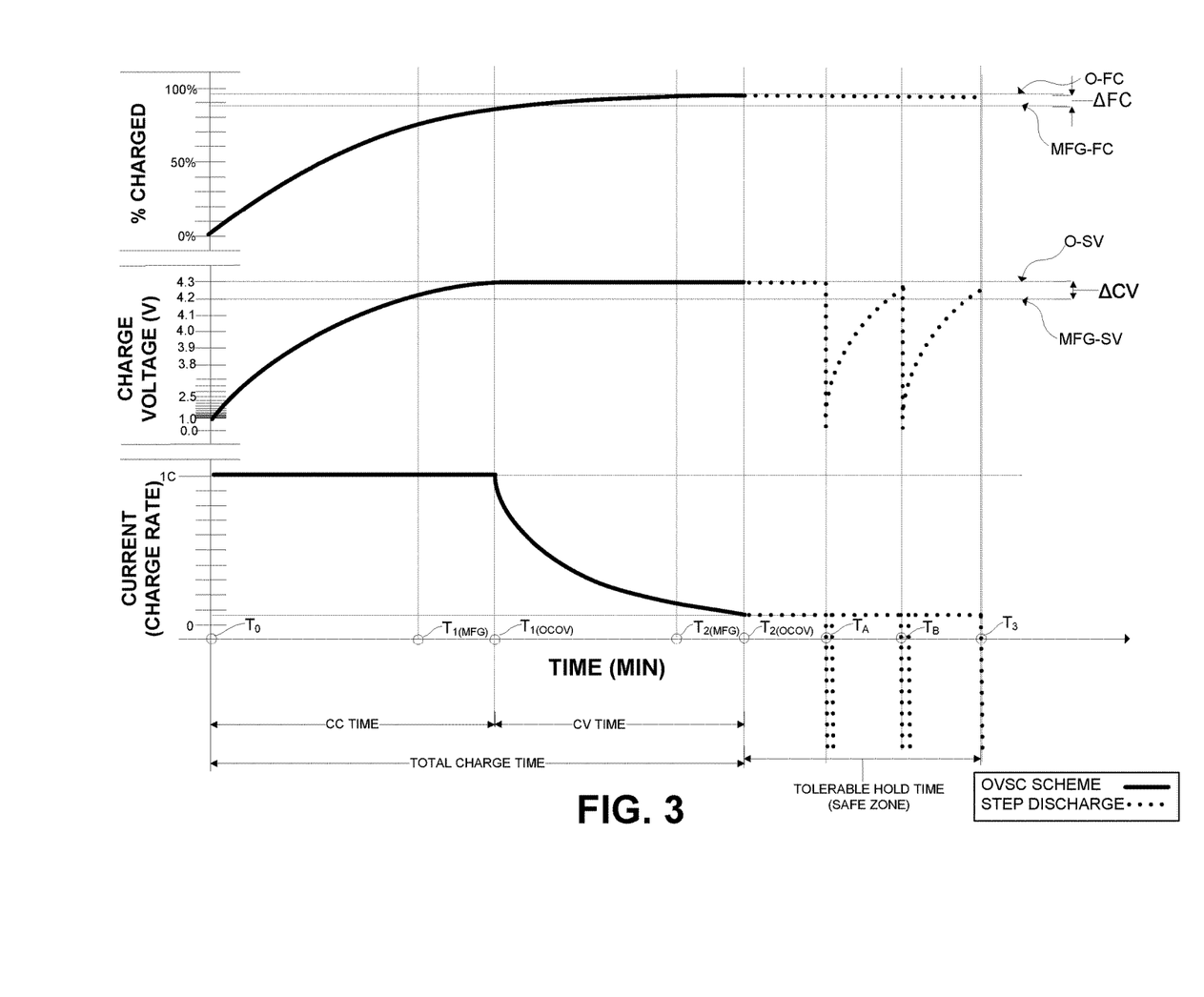
FIG. 3 depicts a charging profile of a battery during and after an exemplary overvoltage overcharging scheme that may be implemented by a battery management system (BMS) in accordance with some embodiments of the present technology.

In some embodiments, the "safe zone" depicted in FIG. 2 (i.e. the time period between $T_{2(OVOC)}$ and $T_3$) may be prolonged by step discharge component 380. Step discharge component 380, similar to charge shedding component 390, may be configured to initiate one or more events to draw charge out of the battery to drop the voltage to a safer level. However, step discharge component draws charge out of the battery in short bursts (e.g. activating all battery operated systems in the vehicle at the same time for 1 ms (or in some embodiments greater than or less than 1 ms)) that may in some instances be more intense than the energy draws from charge shedding component 390. FIG. 3 depicts a charging profile of a battery during and after an exemplary overvoltage overcharging scheme that may be implemented by a battery management system (BMS) in accordance with some embodiments of the present technology. As depicted in FIG. 3, where step discharge component draws charge in quick bursts (e.g. at $T_A$ and $T_B$), there is a corresponding drop in voltage that takes some time to recover from, all while not sacrificing substantial losses in energy stored in battery 300. The recovery time periods where the voltage has not yet returned to the predetermined set voltage (the overcharge voltage, e.g., 4.3), provide an added time cushion (in some instances of up to 60 minutes) to the user before the charge shedding component 390 operates. Each of the quick bursts in FIG. 3, can be implemented by providing a large discharging current, e.g., 10 A, with a short period of time, e.g., 0.1 second.

Figure 4:
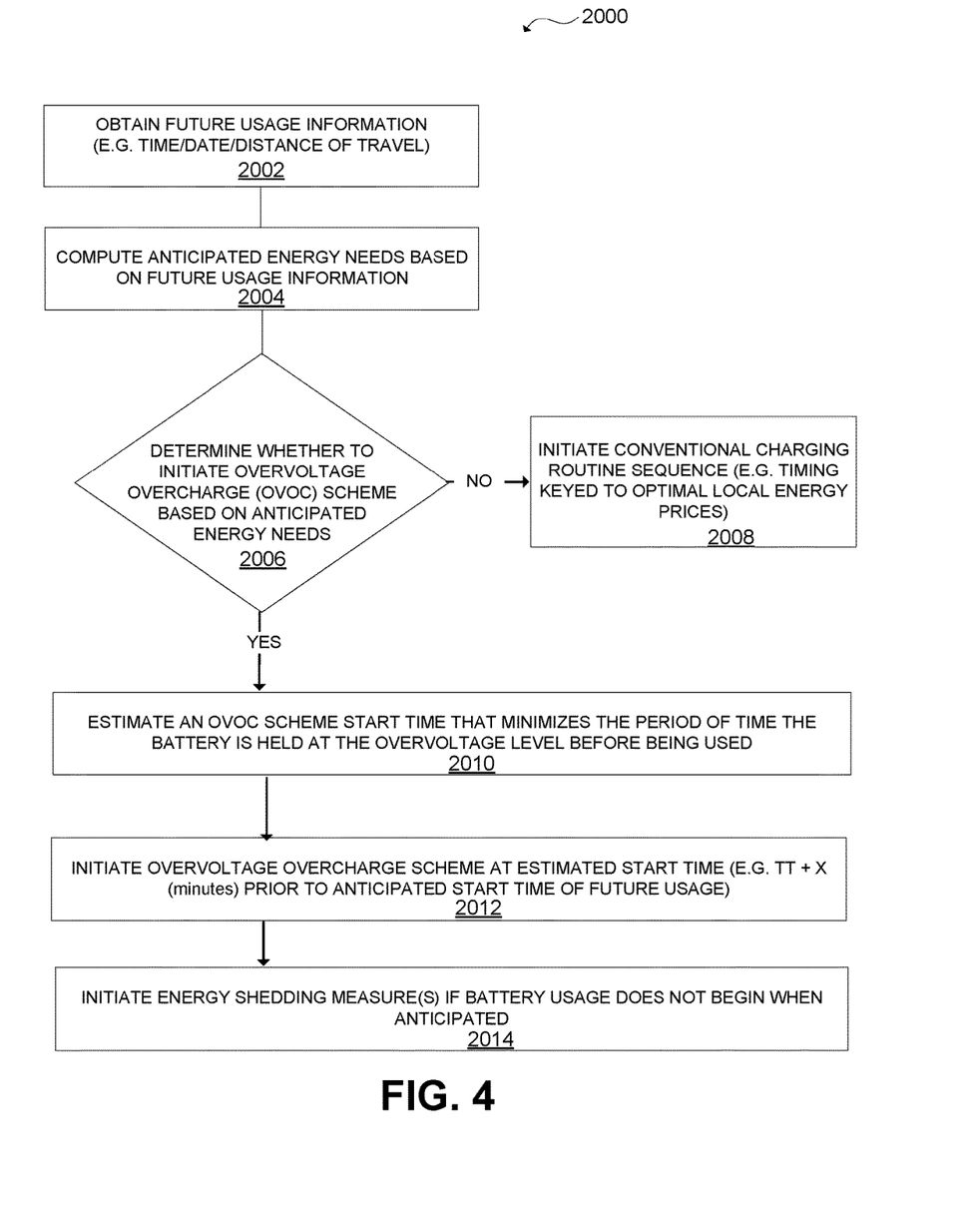
FIG. 4 is a flowchart illustrating a method for intelligent battery overvoltage overcharging in accordance with some embodiments of the present technology.

FIG. 4 is a flowchart illustrating a method for intelligent battery overvoltage overcharging in accordance with some embodiments of the present technology. At operation 2002, method 2000 obtains future usage information (e.g. time/ date/distance of travel/etc.). At operation 2004, method 2000 computes the anticipated energy needs (e.g. the anticipated battery output) based on the future usage information obtained at operation 2002. At operation 2006, method 2000 determines whether to initiate an OVOC scheme detailed herein, based on the anticipated energy needs. If OVOC scheme is unnecessary for the anticipated energy need, then conventional CC-CV charging scheme may be used (e.g. in accordance with the manufacturer's specifications) at step 2008. If OVOC scheme is necessary, however, then at operation 2010 method 2000 determines an estimated start time for the OVOC charging scheme that minimizes the period of time the battery is held at the overvoltage level before being used. At operation 2012, method 2000 initiates the OVOC charging scheme at the estimated start time. At operation 2014, method 2000 may initiate one or more energy shedding measure(s) if battery usage does not begin in accordance with method 2000's computed estimate (or within a predetermined timeframe surrounding to the computed estimate). One of ordinary skill in the art will appreciate that any one or more of the operations carried out by method 2000 (as well as any other methods described herein and variants thereof) may be executed by or in combination with one or more of the components/elements detailed in system 1000 of FIG. 1.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

A person skilled in the art will appreciate that various exemplary logic blocks, modules, circuits, schemes, and algorithm steps described with reference to the disclosure herein may be implemented as specialized electronic hardware, computer software, or a combination of electronic hardware and computer software. For examples, the modules/units may be implemented by one or more processors to cause the one or more processors to become one or more special purpose processors to executing software instructions stored in the computer-readable storage medium to perform the specialized functions of the modules/units.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more tangible and/or non-transitory computer-readable storage media containing computer-readable program codes. Common forms of non-transitory computer readable storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a computer, an embedded processor, or other programmable data processing devices to produce a special purpose machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions (which are executed on the computer or other programmable devices) provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage can be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMS), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The specification has described methods, apparatus, and systems for intelligent recharging of battery cells to enhance energy output. The illustrated steps are set out to explain the exemplary embodiments shown and/or desired, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A battery management system (BMS) connected to a battery comprising:
   a battery status component configured to detect one or more parameters of the battery;
   a timer component configured to compute an amount of time needed to recharge the battery based on one or more of the parameters of the battery;
   a scheme initiation component configured to determine an optimal time to begin charging based on the amount of time needed to recharge the battery;
   a scheme selection component configured to select among a plurality of charging schemes;
   wherein the plurality of charging schemes comprising a normal charging scheme and an overcharging scheme,
   wherein the normal charging scheme allows the battery to be charged to a normal maximum voltage,
   wherein the overcharging scheme allows the battery to be charged to a voltage above the normal maximum voltage; and
   wherein the timer component is configured to compute a total amount of time required to recharge the battery under the overcharging scheme when the scheme selection component selects the overcharging scheme.

2. The BMS of claim 1, further comprising a usage projection component configured to determine an output requirement of the battery.

3. The BMS of claim 2, wherein the usage projection component is further configured to receive information to be used for determining the output requirement.

4. The BMS of claim 3, wherein the information comprises one or more of GPS data, user-generated data, transaction data, historical travel data, calendar data, real-time or historical traffic data, weather data, road condition data, media data, vehicle data, charging station location data, battery capacity data, and number-of-passenger data.

5. The BMS of claim 2, wherein the usage projection component is connected to sources comprising one or more of a temperature sensor, pressure sensor, weight sensor, passenger sensor, GPS system, HAVC system, online source, and mobile device.

6. The BMS of claim 1, wherein the scheme selection component is configured to select the overcharging scheme when it determines that the normal charging scheme is inadequate for an anticipated use of the battery.

7. The BMS of claim 1, wherein the timer component is further configured to estimate an amount of time the battery can sustain a voltage associated with the overcharging scheme.

8. The BMS of claim 7, wherein the scheme initiation component is configured to compute the optimal time using one or more of a departure time, total recharge time, and the estimated amount of time the battery can sustain the voltage associated with the overcharging scheme.

9. The BMS of claim 1, further comprising a charge shedding component configured to draw charge out of the battery.

10. The BMS of claim 9, wherein the charge shedding component is configured to draw charge when the battery is charged to an overcharge level and remain at the overcharge level for at least a tolerable hold time.

11. The BMS of claim 9, wherein the charge shedding component is configured to draw charge out of the battery by turning on one or more vehicle systems.

12. The BMS of claim 9, wherein the charge shedding component is configured to stop drawing charge out of the battery when the battery reaches a normal maximum level.

13. A method of managing a battery comprising:
- detecting one or more parameters of the battery;
- computing an amount of time needed to recharge the battery based on one or more of the parameters of the battery;
- determining an optimal time to begin charging based on the amount of time needed to recharge the battery;
- selecting among a plurality of charging schemes comprising a normal charging scheme and an overcharging scheme, wherein the normal charging scheme allows the battery to be charged to a normal maximum voltage, wherein the overcharging scheme allows the battery to be charged to a voltage above the normal maximum voltage; and
- computing a total amount of time required to recharge the battery under the overcharging scheme when the overcharging scheme is selected.

14. The method of claim 13, further comprising initiating energy shedding when the battery is not used when anticipated.

* * * * *